(12) United States Patent
Hodjat et al.

(10) Patent No.: US 10,994,521 B2
(45) Date of Patent: May 4, 2021

(54) RUBBER PRODUCT WITH WEAR INDICATING LAYERS

(71) Applicant: GATES CORPORATION, Denver, CO (US)

(72) Inventors: Yahya Hodjat, Oxford, MI (US); Yuding Feng, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 104 days.

(21) Appl. No.: 16/053,420

(22) Filed: Aug. 2, 2018

(65) Prior Publication Data

US 2020/0039196 A1  Feb. 6, 2020

(51) Int. Cl.
| | |
|---|---|
| *B32B 27/18* | (2006.01) |
| *F16H 57/01* | (2012.01) |
| *F16G 1/28* | (2006.01) |
| *F16G 5/22* | (2006.01) |
| *F16G 5/20* | (2006.01) |
| *F16G 1/21* | (2006.01) |
| *B32B 1/08* | (2006.01) |
| *B32B 27/12* | (2006.01) |

(Continued)

(52) U.S. Cl.
CPC ............... *B32B 27/18* (2013.01); *B32B 1/08* (2013.01); *B32B 27/12* (2013.01); *F16G 1/21* (2013.01); *F16G 1/28* (2013.01); *F16G 5/20* (2013.01); *F16G 5/22* (2013.01); *F16H 57/01* (2013.01); *B32B 2433/04* (2013.01); *B32B 2597/00* (2013.01); *B32B 2605/00* (2013.01); *B60C 11/24* (2013.01); *F16H 2057/014* (2013.01); *F16L 11/12* (2013.01)

(58) Field of Classification Search
CPC ....................................................... B06C 11/24
See application file for complete search history.

(56) References Cited

U.S. PATENT DOCUMENTS

| | | | |
|---|---|---|---|
| 4,674,622 | A | 6/1987 | Tadashi et al. |
| 5,351,530 | A | 10/1994 | Macchiarulo et al. |

(Continued)

FOREIGN PATENT DOCUMENTS

| | | |
|---|---|---|
| DE | 202008015718 U1 | 3/2009 |
| EP | 1310761 A1 | 5/2003 |

(Continued)

OTHER PUBLICATIONS

DERWENT Abstract of CN204777117 (Year: 2015).*

(Continued)

*Primary Examiner* — Ian A Rummel

(74) *Attorney, Agent, or Firm* — Alyssa K. Sandrowitz, Esq.

(57) ABSTRACT

A polymeric product with at least one surface subject to wear or abrasion, at least a portion of which product includes microcapsules of an indicator substance which is released to indicate a state of wear has been reached. The microencapsulated indicator substance may be a fragrance or a colorant. The indicating portion or zone may be a layer or a thin sheet of microcapsules in rubber or in the polymeric material making up the body of the product. There may be more than one indicating layer or zone in the product. The various zones may contain different fragrances or colorants, which may provide progressive indication of the state of wear.

8 Claims, 2 Drawing Sheets

(51) Int. Cl.
   *B60C 11/24*   (2006.01)
   *F16L 11/12*   (2006.01)

(56) References Cited

U.S. PATENT DOCUMENTS

| | | | |
|---|---|---|---|
| 5,690,146 A * | 11/1997 | Stammen | F16L 11/045 |
| | | | 116/208 |
| 6,653,943 B2 | 11/2003 | Lamb et al. | |
| 7,270,890 B2 | 9/2007 | Sabol et al. | |
| 7,748,521 B2 | 7/2010 | Aizawa et al. | |
| 7,766,157 B2 | 8/2010 | Nishikita | |
| 10,006,536 B2 | 6/2018 | Hazim et al. | |
| 2003/0226611 A1 | 12/2003 | Moriarty et al. | |
| 2004/0266296 A1 | 12/2004 | Martinsson et al. | |
| 2006/0172834 A1 | 8/2006 | Laubender | |
| 2009/0114322 A1 | 5/2009 | O'Brien | |
| 2010/0180473 A1 | 7/2010 | Rosenberger | |
| 2010/0193094 A1 | 8/2010 | Rosenberger | |
| 2012/0157275 A1 | 6/2012 | Peters et al. | |
| 2012/0222766 A1 | 9/2012 | Alexander et al. | |
| 2015/0191332 A1 | 7/2015 | Kere | |
| 2016/0221400 A1 | 8/2016 | Schimmoeller et al. | |
| 2017/0002917 A1 | 1/2017 | Hazim et al. | |
| 2018/0172605 A1 | 6/2018 | Brunner et al. | |
| 2018/0355152 A1 | 12/2018 | Araujo Da Silva et al. | |

FOREIGN PATENT DOCUMENTS

| | | |
|---|---|---|
| JP | 2003183512 A | 7/2003 |
| WO | 2012158505 A2 | 11/2012 |

OTHER PUBLICATIONS

European Patent Office, International Search Report and Written Opinion of the International Searching Authority, International application No. PCT/US2019/044313, dated Oct. 16, 2019.

* cited by examiner

RUBBER PRODUCT WITH WEAR INDICATING LAYERS

BACKGROUND OF THE INVENTION

1. Field of the Invention

This invention relates generally to rubber or polymeric products subject to wear in use, more particularly to belts, hose, tires, and wheels with wear-indicating layers having microencapsulated fragrances or colorants embedded therein.

2. Description of the Prior Art

Many different types of belts are used in power transmission and in many applications from automobiles to motorcycles and from copy machines to many industrial machines and beyond. Also, many tires are used for automobiles, trucks, and many industrial. A great challenge in using and maintaining a belt or tire is to be able to predict the remaining life of the product and when the product has to be replaced. Although as belts and tires become older there are different signs that can determine the age, measuring the wear directly has always been an easy and simple practice, although it requires a gauge and a knowledge of a thickness specification. Other known techniques are not so simple.

U.S. Pat. No. 5,351,530 makes use of a covering canvas impregnated with an anti-static rubber composition based on conductive carbon black by measuring the loss of conductivity to indicate the state of wear of a conductive-rubber-coated fabric. This method also requires a meter and a specification.

U.S. Pat. Pub. No. 2017/0002917 A1 disclose a method for showing a wear state on a V-ribbed belt wherein visually identifiable exposure of a first material buried under a second material is utilized as the criterion for the wear state and detecting removal of the second material in the rib base. In particular, the first material is a different color from the second material.

U.S. Pat. Pub. No. 2016/0221400 A1 discloses a visual wear indicating feature incorporated into the tread pattern of a tire to provide progressive, incremental indications to the customer regarding the amount of useable tread remaining on the tire. The feature involves molding grooves or patterns of progressively increasing depth.

U.S. Pat. Nos. 7,748,521 and 7,766,157 disclose wear detection of progressive removal of magnetic layers having different polarities.

See U.S. Pat. No. 6,653,943 discloses a wear sensor that senses a characteristic of a lift belt representing a predetermined amount of wear of the sheath. The sensed characteristic can be electrical contact with the strands, distance from the surface of the sheath to the strands, or change of color of the sheath surface.

SUMMARY OF THE INVENTION

The present invention is directed to systems and methods which provide an indication of wear in a rubber product without use of a sensor, meter, or even knowledge of a specification. The invention is directed to a rubber or polymeric product at least a portion of which includes microcapsules of an indicator substance which is released to indicate that a state of wear has been reached.

The microencapsulated indicator substance may be a fragrance or a colorant.

There may be more than one layer or zone having such microcapsules. The various zones or layers may contain different fragrances or colorants. The different fragrances or colorants in the different zones may provide progressive indication of the state of wear.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
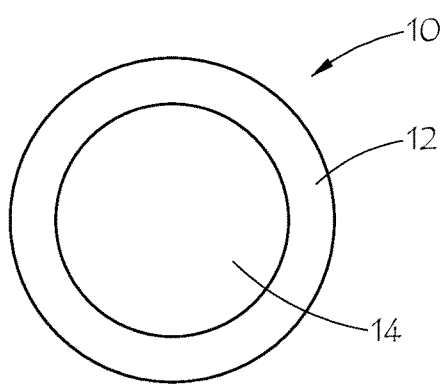
FIG. 1 is a cross-sectional view of a microcapsule for use in an embodiment of the invention.

This invention is about a simple, practical, and accurate way of indicating the wear state of a belt, tire, or any other elastomeric products. The product is thus constructed so that a portion of the product that is subject to wear includes microcapsules of fragrance or colorant. When the state of wear reaches that portion, the microcapsules become exposed and rupture, releasing their contents and providing an indication of the state of wear. That portion is called herein the "indicating zone" or "indicating layer."

In one embodiment, a thin sheet of elastomer may be made for an indicating layer, preferably with a thickness in the range of a few microns and up to one millimeter. Depending on the application, this sheet could be made thinner or thicker than the preferred thickness range. This thin elastomer sheet has embedded therein capsules containing small amounts of a colorant or dye, or a fragrance or scent, or both. The thin sheet is embedded at a predetermined depth as an indicating layer in the elastomeric product. The predetermined depth may be at the surface, in which case, the indication of wear would be given as soon as the surface begins to wear off. The predetermined depth may be somewhere below the surface at which depth the state of wear is desired to be indicated to a user of the product. Once the wear reaches this indicating layer, the capsules break due to the wear and release the colored dye, or the aroma, or both and thus alert the end user that it is time to inspect or replace the worn product, such as a belt or tire.

In other embodiments, multiple indication zones or layers may be used, and these may have different colorants or odorants. For example, a first indicating layer may include a green colorant, or the aroma of pleasant garden flowers, thus indicating that the belt or tire or other product is in good shape. Once this first layer is worn out, a second indicating layer may include a yellow color and/or a more settled aroma to indicate an intermediate state of wear. A final indicating layer may include a red dye and/or an odor that is not very pleasant to indicate a severe state of wear or that it is time to replace the tire or belt or other product.

Many variations of this invention can be envisioned. Using several more relatively thinner indicating zones or layers with progressively changing color and/or aroma could be more desirable to the end customers than using just one, two, or three layers. Also, the thickness of the indicating layer(s) would determine how long the color and aroma will last. The capsules could be arranged or orientated throughout the thickness of the indication zone(s) in a way that there are always some of them in the contact area and ready to break open, keeping the aroma and/or color effect continuous. Alternately, the indicating layers could appear for a while and disappear until further wear exposes the next indicating layer by separating the indicating zones with non-indicating zones.

The elastomeric indicating layer containing the capsules may be made from the same or a similar material as the belt or the tire or other product in order to be compatible or not to reduce the performance of the part. The capsules are small and their concentration and dye content is preferably small enough not to color the environment (road, engine compartment, etc.), rather just to cover the belt or the tire. The capsules may range in size from a diameter, or average diameter, from several undread nanometers to several hundred micrometers. The material for the dye and the aroma are non-toxic, environmentally friendly, and do not affect the performance of the parts. That means, they would not affect coefficient of friction, except by design. For instance, if better friction is needed for certain tires operating in certain conditions such as ice and snow, the dye or any replacement of it could be designed to help increase the friction. Such an indicating layer could be on the outside of the tire and of a desired thickness, so that it could be effective immediately after being put into service.

This invention does not require mechanical or electronic devices nor does it require any technical expertise to determine the wear of a belt or tire quantitatively. Any layman could see colors released on a belt or tire and/or smell the different aromas. Especially for applications in which the end user is close to the rubber part, such as on a motor cycle, having a nice color and a pleasant aroma may add to the appeal of the product. Many end users would appreciate finding a nice smell or a pleasant aroma upon entering their garage. These esthetic appeals also provide a technical function, indicating to the end user the percentage of wear and the remaining life of their tire, belt, or other rubber product.

The elastomeric materials that may be used in products and indicating layers of the invention include all kinds of rubber elastomers and compounds which are generally compounded with fillers, plasticizers, antidegradants, curatives and coagents, to name a few classes of non-limiting compounding ingredients. The elastomeric materials may be thermoplastic elastomers. Typically, the elastomeric product is built up with various material layers, including the indicating layers, then molded, vulcanized, or cured to obtain a final permanent shape with the indicating layers in their desired locations. The various layers including the indicating layers may be produced, for example, by sheeting the elastomer off an open mill, extruding, or calendering, or any other suitable process. Once a layer is made, it may be molded, wrapped, bonded, pressed, etc., into or onto the part and/or may be cured together with the part to become an integral part of it. In a preferred embodiment, the encapsulated materials, in dry powder form, are mixed with natural rubber or synthetic rubbers (such as, EPM, EPDM, CR, SBR, HNBR, BR, ACM, AEM, NBR, etc.) and built onto the wear surface of drive belt, transport belt, tire, hose or wheel. Alternately, a plurality of layers with the same or different encapsulated materials may be built on or under the wear surface of a belt, tire, hose, wheel or other product. Table 1 shows an example of possible rubber recipe, where reinforcing fillers can be carbon blacks or other white fillers (such as silica, talc, clay, etc.), plasticizers can be petroleum oils or synthetic esters, the curative can be sulphur cure system (sulphur plus accelerators) or peroxide cure system (peroxide plus coagent), or it can be cured by other methods, such as radiation curing or ultra-violet light curing.

TABLE 1

Example of rubber recipe.

| Ingredients | PHR |
| --- | --- |
| Rubber | 100 |
| Reinforcing fillers | 20~100 |
| Plasticizers | 5~50 |
| Antioxidants | 1 |
| Encapsulated material | 5~50 |
| Curatives | |
| Sulphur | 1~3 |
| Accelerators | 1~5 |
| Or peroxides (with coagents). | 2~8 |

The inventive concept may also be applied to products and indicating layers based on other thermoplastic or thermoset polymers that are not necessarily elastomers. For example it could be applied to plastic gears, pulleys or wheels subject to wear and needing an indication thereof. In such cases, the manufacturing process might be different than for elastomers, but the resulting structure with indicating zone(s) is similar. For example, for a thermoplastic nylon pulley or wheel (caster), the indicating layer may be over-molded onto a base structure instead of being vulcanized as one part.

Based on the explanation above, it should be clear to ones skilled in the art that there can be various shapes, sizes, and forms for many different products within the scope of the invention. The advantages of this invention include that: it is a simple and effective way to determine the wear state of a belt, hose, tire, or any similar product subject to wear; it can be a cost effective way to determine the wear; it does not require the end user to have particular knowledge, technical expertise, or specifications about wear; it does not require measurement equipment or instruments; it may provide esthetic appeal in addition to the technical benefits.

In addition, the use of thin layers of the same or highly compatible polymer formulations, and low total levels of dye or fragrance which are contained in inert shells, means that the integrity of the article is not compromised. The levels and compatibility can be such that the physical properties of the article body and surface physical characteristics are not changed (except for the color), even when the indicating material is released.

The invention can be used in all belts, tires, hose, and similar products for automotive and non-automotive applications. Drive belts include flat belts, multi-v-ribbed belts, v-belts of all types, toothed belts, and the like. Transport belts include various rubber or thermoplastic-elastomer (TPE) based conveying belts. It can be used in all parts made of polymers that are subject to wear such as rubber wheels, polyurethane wheels, plastic pulleys, plastic wheels, and the like.

It can also be used for products that do not wear in application. The microcapsules can be embedded in an outer layer of material which can be subject to an operation such as machining, grinding, etc., which can expose the capsules and their pleasant effects.

The capsules for use herein may be referred to as microcapsules. Microencapsulation refers to any technology for enveloping small droplets of liquids, gases or fine solid particles with a shell of natural or synthetic polymer. Microencapsulation can be used to protect active ingredients, reduce nutritional loss, mask or preserve flavors, control the release of encapsulated materials, reduce drug dosage, deliver drugs to specific locations, and make handling encapsulated material easier. Carbonless paper was an early commercial application of microencapsulation. In the food industry, microencapsulation is widely used to encapsulate flavors, enzymes, oils, and fats to protect the encapsulated ingredients from environmental conditions such as light, oxygen and moisture for increasing durability, reducing volatility, or transferring liquid to solid for dry mixing. In agriculture, water-soluble fertilizers are encapsulated by waxes, asphalt, and polymers such as polyurethanes, which will avoid higher local fertilizer concentration and reduce the number of applications. In the pharmaceutical industry, microencapsulation is used to control the release of therapeutic agents and prevent overdose after administration. In the cosmetic industry, microencapsulation is used to gain sustained release of deodorants and perfumes.

The encapsulated material in the microcapsules may also be referred to as the core, the internal phase, or the contents, and the encapsulating matrix or shell may also be referred to as a coating, wall material, or membrane. The core can be in any form, such as, crystalline, amorphous, emulsion, suspension of solids, or even smaller microcapsules. The shell can be a single layer or multilayer, and can consist of one or several kinds of materials.

In embodiments of this invention, many materials can be used for the shell, including gums, carbohydrates, cellulose, lipids, inorganic materials, and proteins. For example, the wall materials can be PMU (polyoxymethylene urea) or gelatin, or other polyelectrolytes or inorganic materials. The choice of wall materials depends on the physicochemical properties of the core materials, the process making the microcapsules, and the desired properties of the end product.

The encapsulated colorant or dye material can be one or more inorganic color materials, such as, chromium oxide green, orange molybdate, red iron oxide, white titanox, etc., and/or one or more organic color materials, such as, phthalocyanine green, orange benzimidazolone, red quinacridone, yellow diarylide, etc.

The encapsulated fragrance or aroma material can be one or more synthetic or natural aroma chemicals, such as dimethyl anthranilate, ethyl-2-methyl butyrate, ethyl anthranilate, heliotropine (or piperonal), natural methyl anisate, natural ethyl acetate, etc.

The size of the microcapsules may be several hundred nanometers to a few thousand micrometers, or in the range 0.5 microns to 1 mm. The outside may appear smooth or rough, spherical or irregular. The microcapsules can be provided as free-flowing powders or suspended in water, depending on the applications and stability of the capsules and the encapsulated ingredients.

There are many methods for microencapsulation, including dipping or centrifuging, air suspension coating or fluidized bed coating, spray drying, spray chilling, cocrystallization, liposome entrapment, coacervation, emulsification/solvent evaporation or extraction, interfacial polymerization. Most of these are physical techniques, without chemical reactions. One additional method involving chemical reaction is interfacial polymerization. The selection of a method depends on economics, properties of the core and wall material, microcapsule size, application and release mechanism.

The dipping or centrifuging technique passes core material droplets at high speed through a thin film of liquid wall material, which is then hardened. The process can make uniform and relatively large capsules. In the air suspension coating or fluidized bed coating, fine solid core materials are suspended by a vertical current of air and sprayed with the wall material solution. After the evaporation of the solvent, a layer of the encapsulating material is deposited onto the core material. The process can be repeated to achieve the desired film thickness. The size of the core particle for this technique is usually large. Smaller particles tend to aggregate or get carried away by the exhaust air.

Spray drying involves spraying an emulsion or suspension in a stream of hot gas, generally air or occasionally inert gas such as nitrogen. Polymers are dissolved in a solvent containing the additives to be encapsulated. During spraying, the atomized droplet shrinks as the solvent evaporates, leaving the additives surrounded by polymer. The resulting microcapsules are solid and free-flowing. The core material may be sprayed from an inner nozzle and the encapsulating material from a concentric ring nozzle. Although the high temperature in spray drying is problematic for some thermally unstable materials, it is the main method for encapsulating flavors in the food industry due to its low cost.

Coacervation is an encapsulation technique based on polymer phase separation. The core material is dispersed in a continuous phase in which polymer is dissolved, and the polymer is then gradually deposited onto the core material by inducing precipitation by adding non-solvent for the polymer, adjusting pH, ionic strength or temperature. Commonly used precipitants or nonsolvents include silicone oil, vegetable oil and low molecular weight polybutadiene. When phase separation happens, very fine coacervate droplets appear at first, and they tend to coat solid dispersed particles. The droplets coalesce until a coherent coacervate phase appears surrounding the solid particles. Finally, the coating is solidified by heating, crosslinking or removing solvents by exposing to excess amount of another nonsolvent, such as hexane, heptane, and diethyl ether. The microcapsules are collected by filtration or centrifugation, washed with solvents, and then dried. Coacervation is efficient and can produce microcapsules with a broad range of sizes.

As an example of the current invention, encapsulated materials were successfully mixed into a conventional rubber compound. The encapsulated materials could be colorants or fragrances. A layer of this rubber compound could be put on or under the surface of a belt during the belt building process. During the actual use of the belt on a drive, the microcapsules will break and release the encapsulated dyes or fragrances, thus indicating the wear state of the belt.

Figure 2:
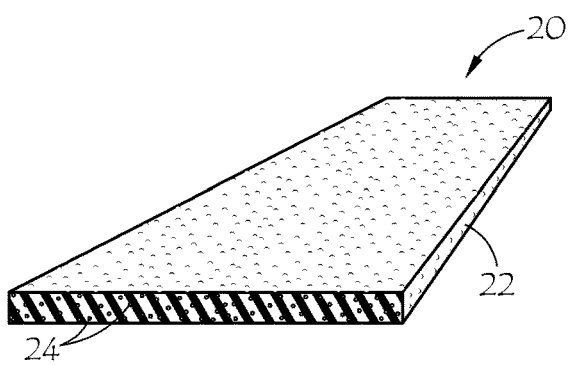
FIG. 2 is a partially fragmented perspective view of a sheet material containing microcapsules for use in an embodiment of the invention.
Figure 3:
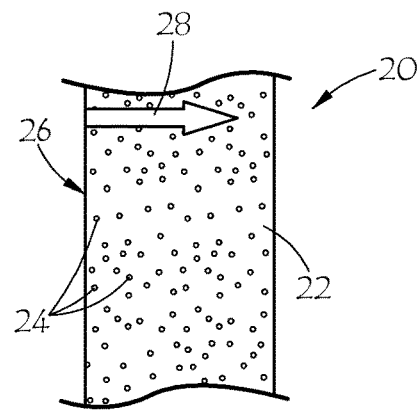
FIG. 3 is a partially fragmented sectional view of an indicating layer according to an embodiment of the invention.
Figure 4:
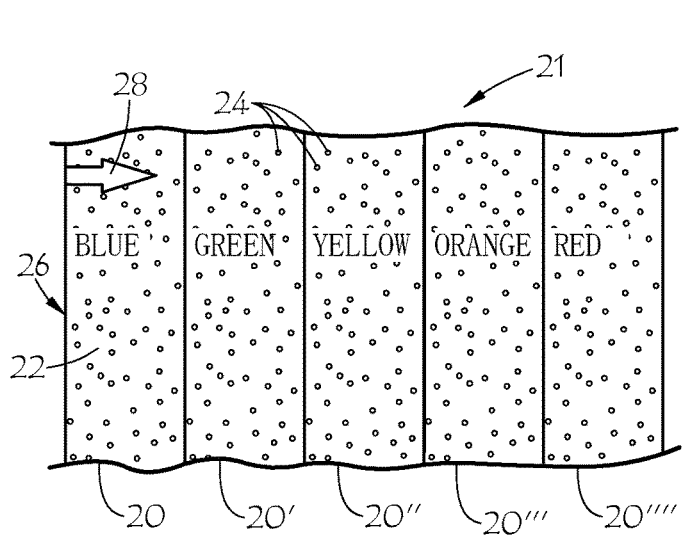
FIG. 4 is a partially fragmented sectional view of a five indicating layers according to an embodiment of the invention.

The figures show various aspects of the invention. FIG. 1 is a cross sectional view of microcapsule 10 with shell 12 surrounding core 14. FIG. 2 is a partially fragmented perspective view of sheet material 20 containing microcapsules 24 embedded in polymer 22. One or more sheet materials 20 may be used to produce one or more indicating layers in or on a product. FIG. 3 is a partially fragmented cross-section of the sheet material 20 showing the wear surface 26 and the direction of wear 28 and capsules 24 embedded on polymer matrix 22. As wear progresses, capsules 24 will burst, releasing the indicating substance onto the surface or surroundings. FIG. 4 illustrates an wear indication structure 21 having five indicating layers with capsules of different colorants in each layer. Again the direction of wear is indicated by arrow 28. Thus, the new product would for a time exhibit a blue color from the capsules in layer 20, followed by green from layer 20', followed by yellow from layer 20'', followed by orange from layer 20''', and finally red from layer 20''''. Thus, the progressive wear is indicated by progressive release of increasingly "hot" colors which indicate the progression from a safe amount of wear (blue and green) to a warning level (yellow or orange), and finally to a level at which replacement should be done (red).

Figure 5:
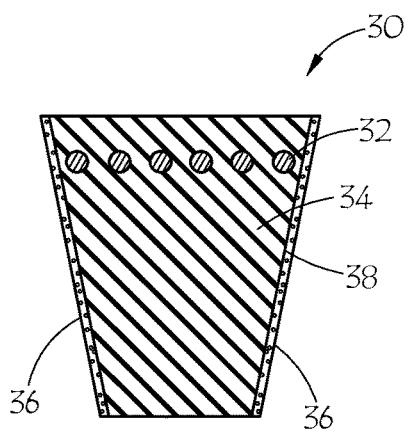
FIG. 5 is a cross-sectional view of a V-belt embodiment of the invention.

FIG. 5 is a cross sectional view of V-belt 30, an embodiment of the invention. V-belt 30 includes tensile cord 32 embedded in elastomeric body 34. Wear surfaces 36 are covered with indicating layer 38 which includes the microencapsulated indicating materials such as dyes or fragrances.

Figure 6:
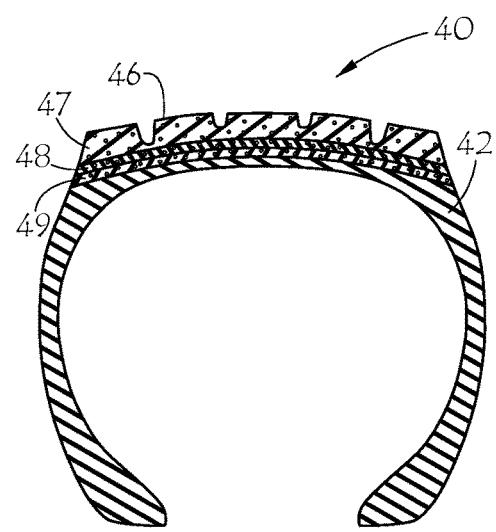
FIG. 6 is a cross-sectional view of a tire embodiment of the invention.

FIG. 6 is a cross sectional view of a tire embodiment of the invention. Tire 40 includes tread material 42 and wear surface 46 which is covered with three indicating layers 47, 48, and 49. As described herein, the three indicating layers may contain different fragrances or dyes to indicate progressively worse wear states to the end user. The three indicating layers may be contiguous or they may be separated by non-indicating layers.

Figure 7:
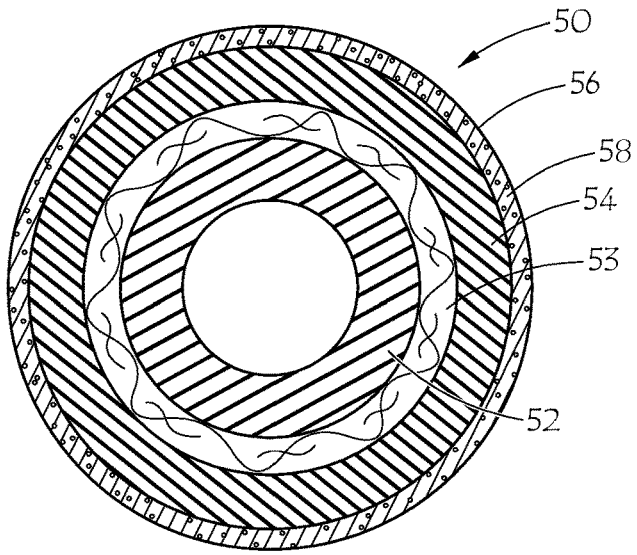
FIG. 7 is a cross-sectional view of a hose embodiment of the invention.

FIG. 7 is a cross sectional view of a typical style of hose embodiment of the invention. Hose 50 includes inner tube 52, reinforcing layer 53, and cover layer 54. The external surface 56 which is possibly subjected to abrasion or wear is covered with indicating layer 58. It should be understood that any desired hose construction may utilize the indicating layer or layers of the invention, whether the hose has fewer or more internal layers or materials than illustrated.

Figure 8:
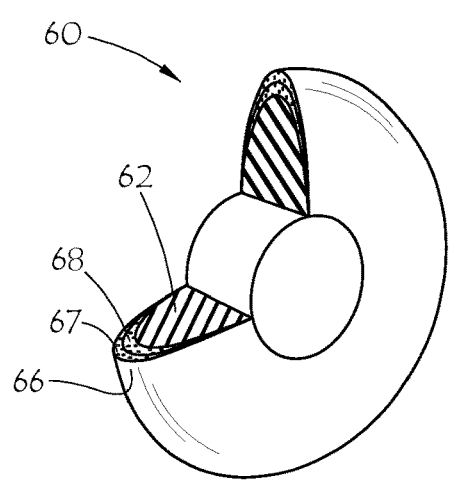
FIG. 8 is a partially fragmented perspective view of a wheel embodiment of the invention.

FIG. 8 is a partially fragmented perspective view of a wheel embodiment of the invention. Wheel 60 is indicated as a solid polymeric wheel, whether thermoplastic, thermoplastic elastomer, or thermoset rubber. Wheel 60 includes body 62 and outer wear surface 66. In this illustration, indicating layer 68 is embedded in the body underneath non-indicating layer 67. Of course, any of the indicating layer or indicating zone arrangements described herein may be applied to the wheel instead.

Figure 9:
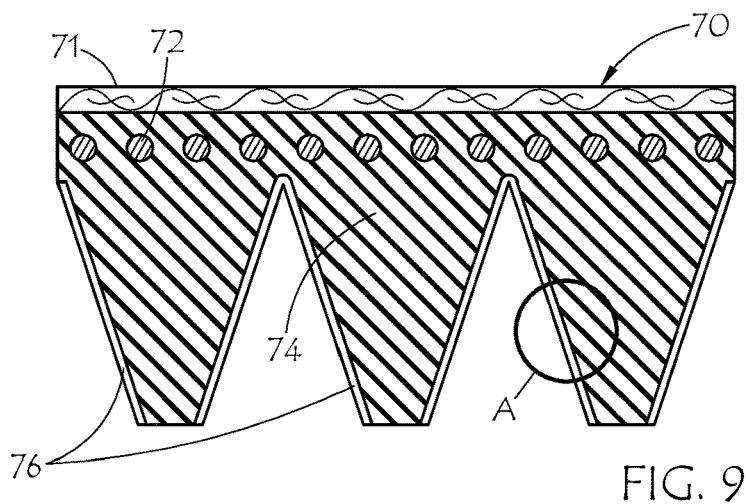
FIG. 9 is a cross-sectional view of a multi-V-ribbed belt embodiment of the invention.
Figure 10:
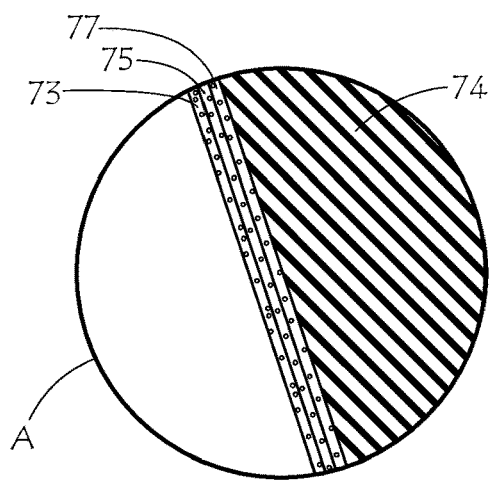
FIG. 10 is a magnified view of portion A of the belt of FIG. 9.

FIG. 9 is a cross sectional view of a multi-V-ribbed belt embodiment of the invention. V-ribbed belt 70 includes three ribs with wear surfaces 76, and tensile cord 72 embedded in belt body 74. Wear surfaces 76 are covered with indicating layers 73, 75, and 77 as shown in FIG. 10 in a magnified view of portion A of belt 70 of FIG. 9. Again, any number of ribs may be in the belt, and any number or arrangement of indicating and/or non-indicating layers may be used in this embodiment, as in all the other embodiments illustrated herein.

Belt 70 in FIG. 9 also has covering jacket 71 on the back side of the belt. Such a covering jacket could be subject to wear also, for example, from backside idlers or belt tensioners in a drive system. A belt covering jacket generally includes a fabric and one or more treatments for adhesion, wear resistance, frictional properties, or other reasons. The fabric may be woven, knit, non-woven, in any desired style. The treatments generally are based on polymeric materials, such rubber latex formulations, rubber solutions, plastic films, or the like. The treatments may be applied in any desired way, before or after belt forming, molding, or curing, for example, by spraying, dipping, laminating, roll coating, knife coating, or the like. In embodiments of the invention, the jacket may be made into wear indicating layer by including microencapsulated fragrance or colorant in the treatment. In other words, the treatments have a polymeric matrix with the microencapsulated indicating materials embedded therein. Other examples of such indicting jackets include the tooth covering jacket on toothed belts, or the jacket fully covering a banded V-belt. Hose articles may also include a cover jacket that may be made indicating of wear in this manner. Thus a covering jacket with wear indicating capsules may be included on any desired wear surface of any type of belt, hose, or other similarly constructed article. The treatment with the indicating capsules may be applied to only one side of the fabric, either the external side or the internal side, depending on the indicating effect desired. Two or more different indicating treatments may be applied, for example as layers analogous to the layered embodiments herein, or on both sides of the fabric. The inner layer could be used to indicate that the jacket is worn through, while the outer layer could indicate a jacket still in good condition.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. An article in the form of a V-belt, a multi-V-ribbed belt, or a toothed belt subject to wear or abrasion in use comprising a polymeric body; a surface subject to wear; one or more indicating layers at or near said surface; wherein each indicating layer comprises a polymeric matrix with microcapsules embedded therein, said microcapsules containing an indicating material comprising a fragrance or a colorant.

2. The article of claim 1 wherein an indicating layer resides at the surface subject to wear.

3. The article of claim 1 comprising two or more said indicating layers.

4. The article of claim 3 wherein said indicating layers are contiguous.

5. The article of claim 3 wherein said indicating layers are separated by non-indicating layers.

6. The article of claim 1 wherein at least one said indicating layer is embedded at a predetermined depth below the wear surface at which the degree of wear would indicate the article should be inspected or replaced.

7. An article in the form of a drive belt or a transport belt subject to wear or abrasion in use comprising a polymeric body; a surface subject to wear comprising a covering jacket; wherein said jacket comprises a fabric and a treatment; wherein said treatment comprises a polymeric matrix with microcapsules embedded therein, said microcapsules containing an indicating material comprising a fragrance or a colorant.

8. The article of claim 7 in the form of a V-belt, a multi-V-ribbed belt, or a toothed belt.

* * * * *